Sept. 25, 1945. D. JACKSON 2,385,415
FISHING HOOK RELEASER
Filed Sept. 28, 1944
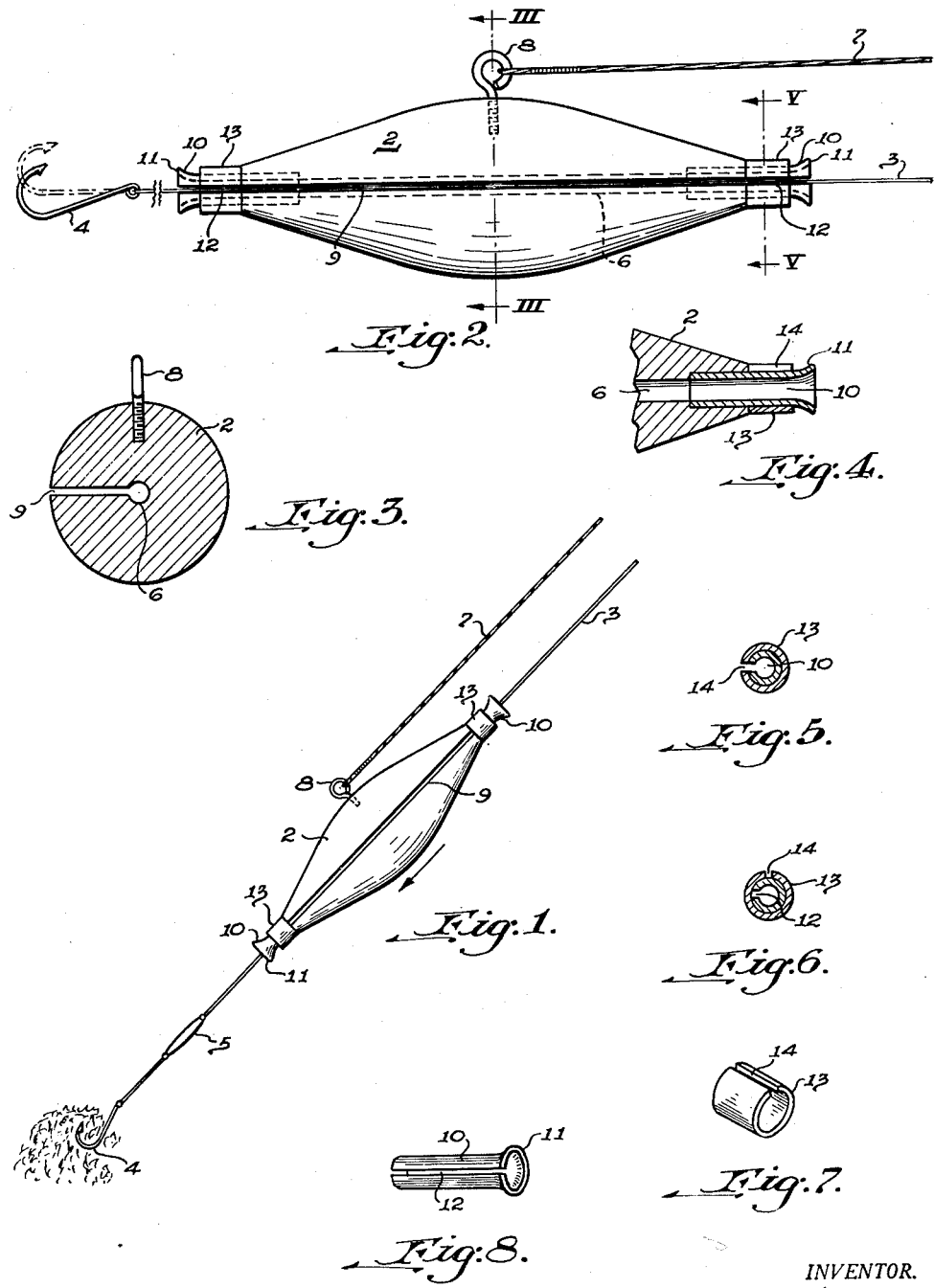
INVENTOR.
DAVID JACKSON.
BY
his ATTORNEY.

Patented Sept. 25, 1945

2,385,415

UNITED STATES PATENT OFFICE 2,385,415

FISHING HOOK RELEASER

David Jackson, Pittsburgh, Pa.

Application September 28, 1944, Serial No. 556,109

5 Claims. (Cl. 43—30)

This invention is an improvement in fishing hook releasers, of that class in which a gravity-actuated weight may be temporarily mounted on the line for impact loosening of the hook from an underwater obstruction.

It comprises a centrally channeled weight, of suitable form for easy rapid passage downward through water, having a straight longitudinal insertion and removal slot for the fishing line, means for retaining the line centrally through the weight with ample clearance for the line and sinker, and having at one or both ends a hook abutting terminal, and a retrieving connection.

In the drawing, showing one preferred construction of the invention:

Fig. 1 is a general elevational view illustrating the several elements in operative position;

Fig. 2 is an enlarged or full size side elevation of the device as a whole;

Fig. 3 is a cross section on the line III—III of Fig. 2;

Fig. 4 is a longitudinal sectional view through one end of the gravitating weight body;

Fig. 5 is a cross section on the line V—V of Fig. 2 showing the insertion slot open;

Fig. 6 is a similar view, corresponding to Fig. 5, showing the retaining ring in closed position;

Fig. 7 is a perspective detail view of the retaining ring;

Fig. 8 is a detail view of one of the endmost terminal guides.

The gravitating weight 2, of suitable heavy material, as metal, preferably bronze, lead, or other preferably non-corrosive material, is of generally cigar shape, circular in cross section, and tapering from a middle maximum diameter toward each end, as shown.

For the purpose of providing free movement over the fishing line 3 toward the terminal hook 4, and with clearance of one or more sinkers 5, if used, the weight 2 is provided with a central longitudinal cylindrical clearance opening 6, through which the line 3 extends when in position.

For the purpose of retrieving the device for one or more downward impact movements, a retrieving line 7 is connected with the weight 2 at the middle or either end portion, by means of an eyelet or other suitable device 8. As shown, the eyelet is annularly located well beyond the line placement slot 9 to avoid tangling with the line 3.

Extending laterally inwardly from the exterior of the weight throughout its length to the central opening 6, is such a longitudinal straight slot 9, just sufficiently wide to provide for sidewise insertion and removal of the main line 3. Each end of the body 2 is provided with an inserted tubular guide terminal 10, preferably provided with a flaring edge 11 for impact against the hook 4, which terminal is also longitudinally slotted as at 12, for alinement with slot 9.

For the purpose of retaining the line 3 against accidental removal laterally, I utilize a split closing ferrule or ring 13, divided by slot 14. Such ring surrounds the shank of member 10 with sufficient friction to avoid accidental displacement, when it is rotated to non-registering position with slot 12, as in Fig. 6.

The split ring or ferrule 13 itself may have sufficient resiliency to effect ample frictional contact to hold it in position on the terminal 10.

Each of the terminal tip members 10 is inserted into each of the opposite ends of the weight with sufficient rigidity to insure against displacement or loss, as by a driving fit or thread engagement. The hook-contacting terminal edge 11 extends outwardly beyond each end of the weight but a short distance, as illustrated.

The construction and operation of the invention will be readily understood from the foregoing description and drawing. Assuming that the terminal hook has become engaged or entangled with any obstructing material, as weeds, rocks, submerged log, or the like, placement of the device is as follows. With the slots 14 of rings 13 turned to register with the main slot 9 and slots 12, line 3 may be quickly and easily inserted therethrough and within the central longitudinal clearance opening 6 of the weight and within the terminals 10.

Thereupon, by rotation of rings 13, any accidental removal of the line will be prevented, and the weight is thus capable of being lowered by gravity along the main line 3, as in Fig. 1, for impact against the hook.

After such attachment, with retrieving line 7 withdrawn and then slack, one or more gravitating impacts against the terminal hook tends to affect its removal from the snag connection. Thereupon the weight may be then retrieved, as by raising both lines from the water within reach of the angler, whereupon the weight and its retrieving line may be quickly and easily disconnected and removed from the main line 3, by merely rotating the rings 13 to slot registering positions.

It will be understood that the shape of the member 2 may be varied in design or weight, depending on varying conditions, and the device is then easily stowed away until needed further.

The construction is extremely simple, cheap, easily and readily manufactured, and is highly efficient in the manner intended.

It has effective and desirable advantages over prior constructions, such as disclosed in Patent No. 720,136, to Halliran, in avoiding the objections incident to the double curved slot E; also in the means provided for preventing either gradual or accidental separation of the weight from the line; and in respect of its general utility and serviceability because of its inherent improved features, as above specified and illustrated.

It may be changed or modified to suit different conditions of use or otherwise by the skilled mechanic, but all such changes are to be understood as within the scope of the following claims.

What I claim is:

1. Means for releasing a fish hook consisting of a weight having a longitudinal central opening for a fishing line and a straight longitudinal slot communicating therewith, an endmost tubular terminal having a slot registering therewith, and a slotted retaining ring for the line rotatably mounted on the terminal.

2. Means for releasing a fish hook consisting of a weight having a longitudinal central opening for a fishing line and a straight longitudinal slot communicating therewith, a pair of endmost tubular terminals each having a slot registering with said slot, and a slotted retaining ring for the line rotatably mounted on each of said terminals.

3. Means for releasing a fish hook consisting of a cylindrical metal body tapered towards each end having opposite terminal hollow extensions and a communicating central opening, a continuous longitudinal slot extending through the body at one side to the central opening of the body and through said extensions, each of said extensions having a rotatable slotted binding ring.

4. A fish hook releaser as in claim 3 characterized by an endmost flaring annular edge for engagement with a resisting hook.

5. In combination with a main fishing line and its hook, a releasing weight having a central longitudinal opening and endmost tubular terminals providing line clearance, said weight and terminals having longitudinally registering slots for line clearance from the exterior to the central openings, a rotatable slotted ring on each of said terminals, and means for connecting a retrieving line to the weight.

DAVID JACKSON.